(12) United States Patent
Song

(10) Patent No.: US 6,421,688 B1
(45) Date of Patent: Jul. 16, 2002

(54) METHOD AND APPARATUS FOR DATABASE FAULT TOLERANCE WITH INSTANT TRANSACTION REPLICATION USING OFF-THE-SHELF DATABASE SERVERS AND LOW BANDWIDTH NETWORKS

(75) Inventor: Suntian Song, Philadelphia, PA (US)

(73) Assignee: Parallel Computers Technology, Inc., Wayne, PA (US)

( * ) Notice: Subject to any disclaimer, the term of this patent is extended or adjusted under 35 U.S.C. 154(b) by 0 days.

(21) Appl. No.: 09/517,248

(22) Filed: Mar. 2, 2000

Related U.S. Application Data

(60) Provisional application No. 60/160,606, filed on Oct. 20, 1999.

(51) Int. Cl.$^7$ .................................................. G06F 17/30
(52) U.S. Cl. ........................ 707/203; 707/202; 707/204
(58) Field of Search ............................... 707/202, 203, 707/204

(56) References Cited

U.S. PATENT DOCUMENTS

| | | | |
|---|---|---|---|
| 5,363,121 A | * 11/1994 | Freund | 709/101 |
| 5,440,727 A | * 8/1995 | Bhide et al. | 711/117 |
| 5,509,118 A | 4/1996 | Tuulos et al. | 714/16 |
| 5,689,706 A | * 11/1997 | Rao et al. | 707/201 |
| 5,740,433 A | 4/1998 | Carr et al. | 395/618 |
| 5,745,753 A | 4/1998 | Mosher, Jr. | 395/618 |
| 5,748,882 A | 5/1998 | Huang | 395/184.01 |
| 5,751,932 A | 5/1998 | Horst et al. | 395/182.1 |
| 5,761,499 A | 6/1998 | Sonderegger | 395/610 |
| 5,764,903 A | 6/1998 | Yu | 395/200.38 |
| 5,781,910 A | 7/1998 | Gostanian et al. | 707/201 |
| 5,799,323 A | * 8/1998 | Mosher, Jr. et al. | 707/202 |
| 5,812,751 A | 9/1998 | Ekrot et al. | 707/182.02 |
| 5,815,651 A | 9/1998 | Litt | 395/182.08 |
| 5,819,020 A | 10/1998 | Beeler, Jr. | 395/182.03 |
| 5,835,755 A | 11/1998 | Stellwagen, Jr. | 395/600 |
| 5,835,915 A | * 11/1998 | Carr et al. | 707/202 |
| 5,870,763 A | 2/1999 | Lomet | 707/202 |
| 5,873,099 A | 2/1999 | Hogan et al. | 707/204 |
| 5,875,291 A | 2/1999 | Fox | 395/112.13 |
| 5,890,156 A | 3/1999 | Rekieta et al. | 707/10 |
| 5,924,094 A | 7/1999 | Sutter | 707/10 |
| 5,933,838 A | 8/1999 | Lomet | 707/202 |
| 5,938,775 A | 8/1999 | Damani et al. | 714/15 |
| 5,946,698 A | 8/1999 | Lomet | 707/202 |
| 5,948,109 A | 9/1999 | Moiin et al. | 714/4 |
| 5,951,695 A | 9/1999 | Kolovson | 714/16 |
| 6,035,412 A | * 3/2000 | Tamer et al. | 714/6 |
| 6,085,200 A | * 7/2000 | Hill et al. | 707/202 |
| 6,101,497 A | * 8/2000 | Ofek | 707/10 |

OTHER PUBLICATIONS

Tandem Computers Inc., "A Flexible ServerNet–Based Fault–Tolerant Architecture," 25th International Symposium on Fault Tolerant Computing, Pasadena CA, Jun. 27–30, 1995.

Compaq Computer Inc., "Nonstop SQL/MP—Database Product Description," http://www.tandem.com/prod_des/nssqlpd/nssqlpd.pdf, Apr. 1999, pp. 1–12.

"Sybase Replication Server 11.5," http://www.sybase.com/products/datamove/repsrvr.html, 1995, printed on Jun. 19, 2000.

(List continued on next page.)

Primary Examiner—Charles L. Rones
(74) Attorney, Agent, or Firm—Volpe and Koenig, P.C.

(57) ABSTRACT

This invention concerns providing a fault tolerant data service using multiple redundant off-the-shelf-database servers connected by low bandwidth networks. The data service continues operation regardless partial processing hardware failures, network failures, operating system failures and incidental database malfunctions. A database gateway automatically replicates database communication packets and monitors the wellness of communication networks and supporting database servers. It can quickly identify a unstable connection or a database server, thus providing highly reliable data service to all clients. An algorithm is disclosed to accomplish these tasks using minimal original client data.

24 Claims, 9 Drawing Sheets

Figure 1:
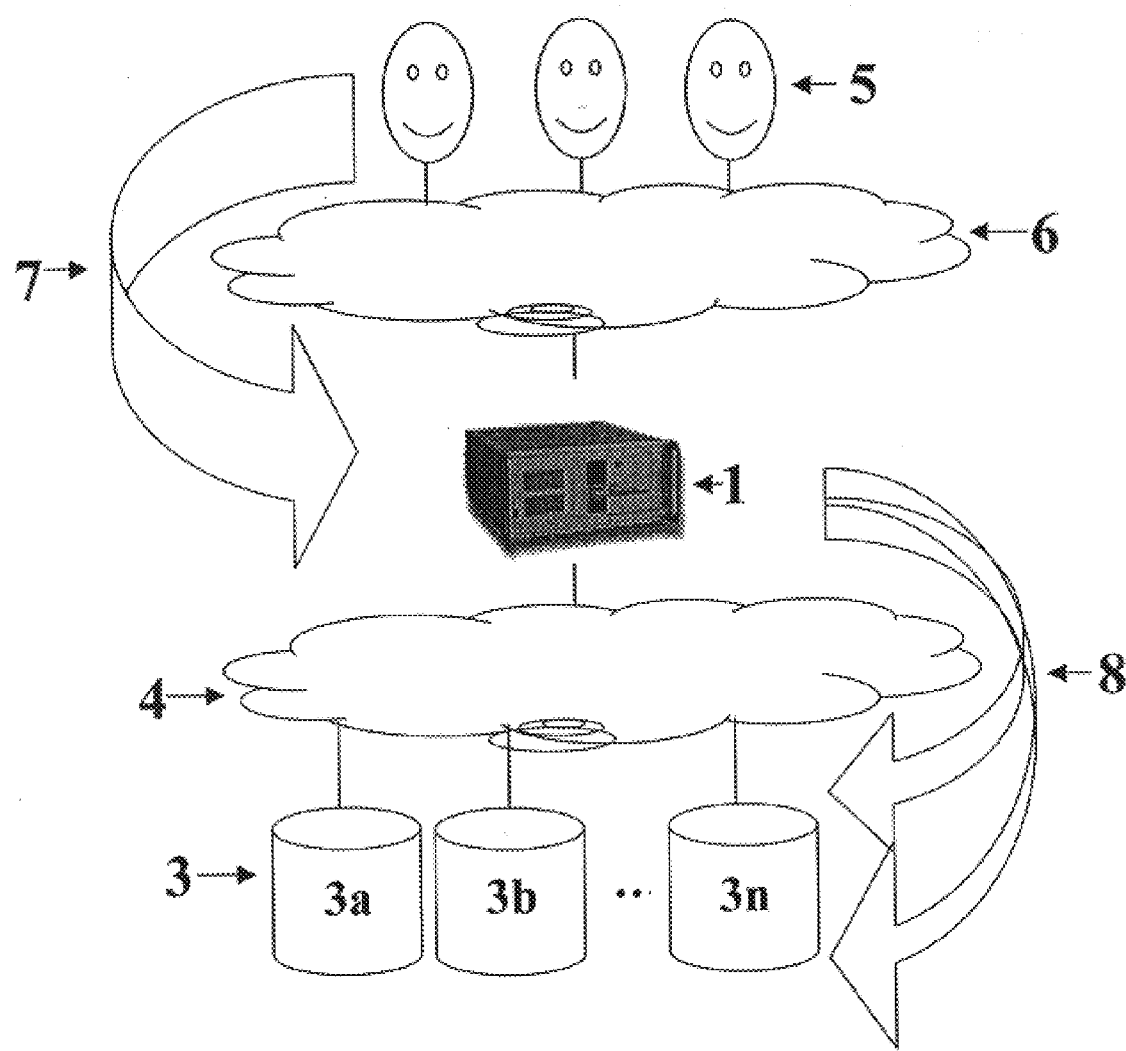

```
30  Setup client connection.
31  Open connections to all members of the database server group.
32  Switch the primary database server to a different server if cannot
    connect to the primary server.
33  Disable all non-functional database servers.
34  While (not (server_down or error or client_disconnect) )
35      Read client query
36      If encrypted, then decrypt the query.
37      Process client login information.
38      Send the query content to all database servers, switch the
        primary if it is not functional or unreacheable.
        Exit if cannot switch.
39      If received transaction packets from the client, then
40          Read the primary server's reply, switch the primary if it
            is not functional or unreacheable. Exit if cannot switch.
41          Log this transmission, if configured as such.
42          If this database is READ-ONLY, then send STOP signal
            to non-primary database servers.
43          If this connection is encrypted, then encrypt this packet
44          Send the read content to client.
45          Read and throwaway the replies from all non-primary
            database servers.
46      End if
47  End while.
48  Close all connections.
49  Release all resources allocated to this connection.
```

OTHER PUBLICATIONS

Steve Bobrowski, "Implementing Data Replication," http://www.oracle.com/ormag/oracle/96–May/36client.html, May 1996.

"Theory of Operations—Double Take Version 3.0 for Windows NT and Solaris", http://www.nsi.com, No date.

"High Performance Computing Cluster Tools 3.0", http://www.sun.com/software/solutions/hpc/index.html, 1999.

The Linux Documentation Project, "Setting Up Redundant Networking—IP Take Over," http://halinux.rug.ac.be/High–Availability–HOWTO–8.html, printed on Jun. 19, 2000.

John Wack, "Introduction to Firewalls," Internet document, Feb. 9, 1995. http://ftp.sunet.se/pub/security/docs/nistpubs/800–10/node30,html.

Oracle Backup and Recovery Guide, Release 8.0, A58396–01, printed on Jun. 16, 2000.

* cited by examiner

| | |
|---|---|
| 30 | Setup client connection. |
| 31 | Open connections to all members of the database server group. |
| 32 | Switch the primary database server to a different server if cannot connect to the primary server. |
| 33 | Disable all non-functional database servers. |
| 34 | While (not (server_down or error or client_disconnect) ) |
| 35 |     Read client query |
| 36 |     If encrypted, then decrypt the query. |
| 37 |     Process client login information. |
| 38 |     Send the query content to all database servers, switch the primary if it is not functional or unreacheable. Exit if cannot switch. |
| 39 |     If received transaction packets from the client, then |
| 40 |         Read the primary server's reply, switch the primary if it is not functional or unreacheable. Exit if cannot switch. |
| 41 |         Log this transmission, if configured as such. |
| 42 |         If this database is READ-ONLY, then send STOP signal to non-primary database servers. |
| 43 |         If this connection is encrypted, then encrypt this packet |
| 44 |         Send the read content to client. |
| 45 |         Read and throwaway the replies from all non-primary database servers. |
| 46 |     End if |
| 47 | End while. |
| 48 | Close all connections. |
| 49 | Release all resources allocated to this connection. |

FIG. 2B

METHOD AND APPARATUS FOR DATABASE FAULT TOLERANCE WITH INSTANT TRANSACTION REPLICATION USING OFF-THE-SHELF DATABASE SERVERS AND LOW BANDWIDTH NETWORKS

This application claims priority from provisional application No. 60/160,606, filed Oct. 20, 1999.

BACKGROUND

The present invention relates to the field of high performance fault tolerant database systems using off-the-shelf database servers. More particularly, this invention provides non-intrusive non-stop database services for computer applications employing modern database servers.

Data service is an essential service for electronic commerce and information service applications. Among all different data service technologies, such as flat files, indexed files, multiple linked files or databases, database is most preferred. Database servers are complex software systems providing efficient means for data storage, processing and retrieval for multiple concurrent users. Typically, a database server is implemented on top of an existing operating system—a lower-level software system providing management facilities for efficient use of hardware computing and communication components. The correct execution of a database server relies on the correct execution of the operating system tasks storage systems, computer servers, networking equipment and operating systems. Therefore, failures of any one component can affect the normal operation of database service.

In general, the degree of fault tolerance of a database service depends on how quickly and reliability a database service can detect and recover from a failure or fault. The capability to fault tolerance can be evaluated in two ways: 1) ability to detect a database service failure; and 2) ability to mask a detected service failure in real time. Database service failure can be either hardware failure or software failure. In view of the tight binding among hardware, operating system and database server, it is often difficult to pin point where a failure started. Hardware related fault tolerance technologies use hardware redundancy to prevent component malfunctions. For example, redundant array of inexpensive disks (RAID) technology is well known and functions by replicating hardware disks and distributing replicating data over several disks, using disk mirroring and striping at the hardware level to increase the availability of data and to prevent data storage failures. Hardware related failures have become minimal due to the dramatic increase in the reliability of hardware components and the dramatic decrease in costs. Recent statistics show that software related failures account for the majority of database service failures. Hardware replication technologies can resolve hardware related problems, but cannot provide fault resilience to the operating system and database system malfunctions. Usually commercial database applications do not directly interface with hardware, but interface indirectly through the operating system. In general, database malfunctions of commercial database applications are not detected by hardware that will continuously operate irrespective of a database malfunction. There are few hardware-aware multi-processor database systems available that can detect hardware and database malfunctions directly, but they are prohibitively costly. They require extensive changes to database server software. They lack the continuous operation capability due to their inability to repair components while allowing database accesses. They also lack the continuous capability for it is impossible to pause and update one processor while letting users accessing the data through another processor. Examples of these systems include Compaq's Nonstop-SQL and Stratus Computer's proprietary database systems.

In a multi-users multiple redundant database servers environment, race conditions are major problems that cause database lockups and data content inconsistency in the multiple database servers. The ability to run multiple independent redundant database servers concurrently without a race condition is referred to herein as instant transaction replication. There are several database fault tolerance approaches to resolve such race conditions.

One method provides non-concurrent transaction replication using high speed replicated servers. U.S. Pat. No. 5,812,751 to Ekrot, et al. discloses a primary server and a monitoring standby server connecting to the same storage system. Once the primary system fails, the standby server will automatically take over the store system and assumes the operation previously performed by the failed primary server. This method also requires extensive changes to a database server software. More importantly, this method allows the data storage system to be the single point to failure. Any software malfunction that leaves any mark on the data storage contents will lead to an unrecoverable database system. A problem with the non-concurrent replication method is that the single point of failure is the shared storage system. As the user access frequency increases, multiple transactions can be lost in the event of the primary database server crash. This method also does not allow "on-line repair" or continuous operation of the database.

U.S. Pat. No. 5,745,753 to Mosher, Jr. discloses another non-concurrent remote data duplicate facility (RDF) that maintains virtual synchronization of the backup database with the local database. The RDF includes an extractor process executed by the local computer system, a receiver process and a plurality of update processes by the remote system. The extractor process sends sequential numbered audit trail records to the remote receiver process while the application performs online database restructuring in the local computer. The update process of the remote system, based on the incoming audit trail records, performs the same operation on the backup database. The traction manager stores a stop update audit record in the local audit trail where each online database restructuring successfully completes. Both local and remote processes use these sequential numbered audit records to cross check if any database operation is out of order. Acknowledge and redo commands will pass back and forth between the RDF and local databases. A crash of the local computer system can result in incomplete transaction logs for all replication servers rendering the entire system unrecoverable.

A conventional software method for computer system fault tolerance is file system replication or disk mirroring. A file system is the basic building block of any operating system for storage management, such as hard disks. A replicated file system uses a special storage device driver that maintains the identical appearance to user programs so they "think" the storage device remains the same while it duplicates each disk I/O request to both the local file system as well as remote backup file system. This method is highly transparent to users since it does not require any modification to existing application programs. In the event of the primary system failure, the replicated file system can be used to restart all services. U.S. Pat. No. 5,764,903 to Yu discloses a virtual disk driver used between a primary server and a secondary server which are mirroring over a network. That system uses a disk write request, also handles the control to operating system which in turn invokes the virtual disk driver. The virtual disk driver monitors both primary and secondary disk write operation, the control does not return to the calling application until the disk write is committed to both the primary and secondary disks. This method can protect most desktop applications, such as word processors, spreadsheets and graphics editors, from failure of the most of hardware fault and the operating system error. However it cannot protect the users from database server crashes, because the timing of database server command executor is not maintained.

U.S. Pat. No. 5,781,910 to Gostanian, et al. discloses distributed transaction database replicas. A single database manager employs an atomic commit protocol such as 2 phase commit (2PC) protocol. The basic idea behind 2PC is to determine a unique decision for all replicas with respect to either committing or aborting a transaction and then executing that decision at all replicas. If a single replica is unable to commit, then the transaction must be aborted by all replicas. The '910 patent further modified the 2PC protocol by designating one database server as the coordinator that is responsible for making and coordinating the commit or abort decision.

Such prior art systems do not resolve a variety of database sever fault recovery problems. For example, assume that there is a transaction containing sequence of record inserts and record deletes to tables with at least one index. This is very common in modern database applications since an indexed table allows faster search of its contents. Each insert or delete in an indexed table requires a re-indexing of the entire table. The file replication method will duplicate every disk update to both local and a remote file system. Assume further that the database server crashes after the database server's second phase commit but before the completion of the index updates. Some of the indexes will be corrupted rendering all queries dependent on these indexes useless. A file replication system can only replicate the problem.

It would be extremely beneficial to the electronic commerce and information service community to provide a fault tolerance database server system and method to allow automatic detection and recovery of all database software and hardware failures in real time using instant transaction replications. Such a system would satisfy true "zero closing time" of electronic commerce on a global scale.

SUMMARY

The present invention involves the use of a database gateway to replicate database transactions in real time, and that provides automatic error detection and recovery for database service software and hardware failures. This invention also features on-line repair of database servers, that ensures continuous operation of the database services (such as Microsoft SQL Server®, Oracle®, Sybase®, DB2®, Informix® and others.) The invention can also be used to provide instant database transaction replication to centralized and geographically dispersed homogeneous or heterogeneous database servers.

One embodiment of the invention, multiple database clients connect to a redundant database server group via a database gateway that connects at least two database servers as a pair of mirror servers with the same database contents. Instant transaction replication guarantees all servers are synchronized in data contents. In such a system, every server is a backup to any other server in the same group. Therefore the reliability of the overall system increases proportionally as the number of redundant database servers increases. The database gateway can also be protected from its own failure by using a slave database gateway that monitors and protects the master database gateway in real time.

The basic principle of the present invention is replicating a database queries instead of just doing storage replication, since the majority of database queries are shorter than the storage updates generated by the query, the amount of the replicated data using this invention is greatly reduced. In both high and low bandwidth environments, the invention continuously monitors and intercepts the database inquiries between communication links and the database servers. It can redirect a communication link to a healthy server, if the connected server or the communication link reaches a designated failure level. This re-direction happens at the communication data packet level resulting in a repaired client-to-server connection data link in real time. The communication link interception and repair are completely transparent to the user applications. Since the database gateway does not keep the actual data, the hardware requirements of the database gateway is less demanding then that for a database server. A database gateway can be built using 100% off-the-shelf commodity components.

One object of the present invention is taking advantage of the concurrent processing of multiple database servers and multiple independent networks to balance the communication load among database clients and the servers, for instant database service failure detection and recovery including both hardware and software related malfunctions. The prior art does not address both malfunctions with high efficiency and reasonable cost.

It is another object of the present invention to provide performance enhancement by eliminating unnecessary waiting times due to the use of multiple redundant database servers shown in prior arts. The performance of the fault tolerant database service of the present invention is comparable to a non-fault tolerant database server where the clients connect directly to the database server without the database gateway.

Another object of the present invention uses algorithms to minimize the duplication client data and reduce the overhead of achieving fault tolerance processing in parallel. Therefore it is suitable for both high and low bandwidth networking environments.

It is another object of the present invention to isolate database clients from direct access to the physical data. Thus it allows adding security features, such as data access control and encryption, for the existing database system without changing a running database environment. This allows greater extensibility of a working database system to include clients and database servers connected only through the public networks, such as the Internet.

BRIEF DESCRIPTION OF THE DRAWING(S)

FIG. 1 presents the top-level architecture of the said invention.

Figure 2A:
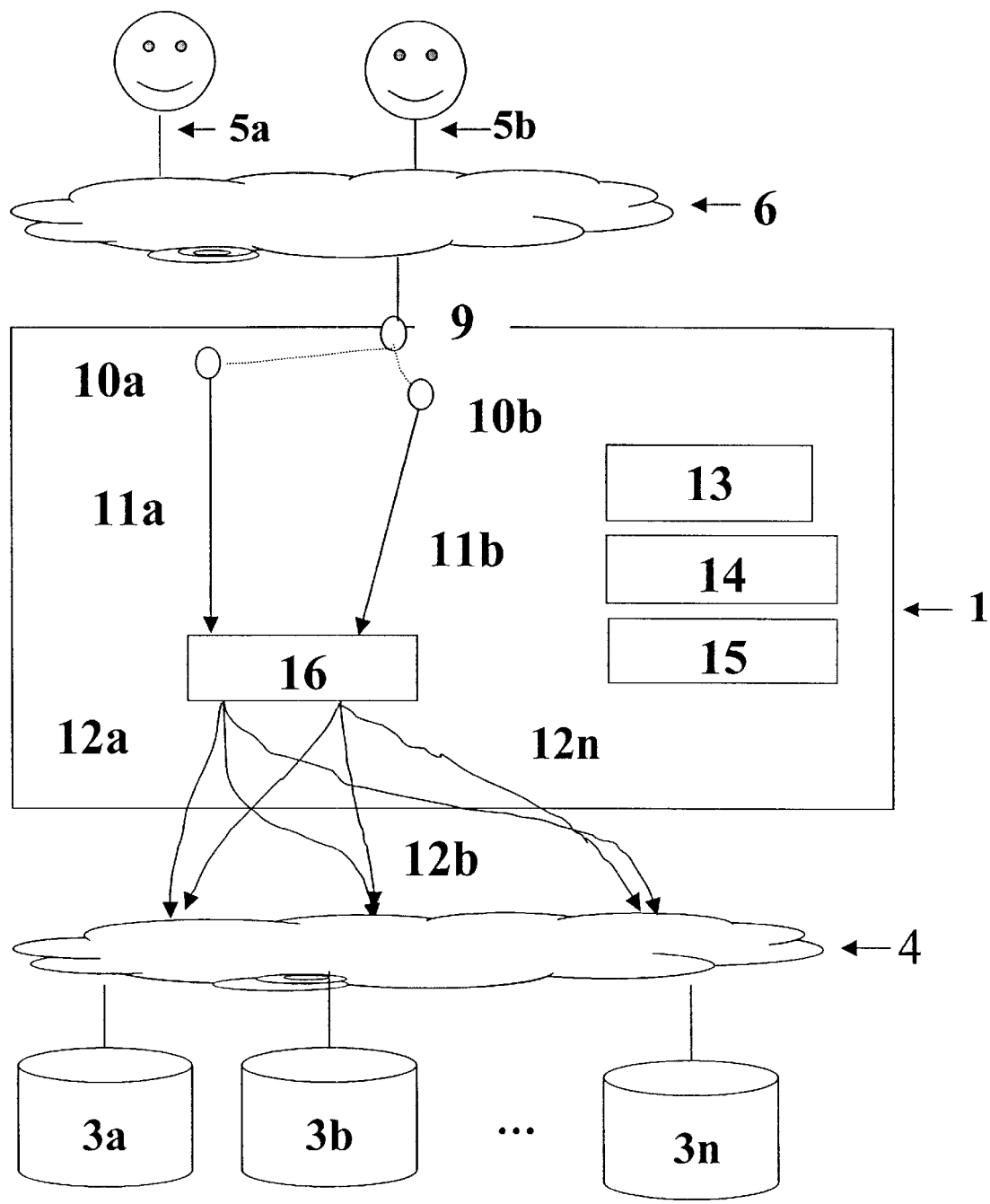

FIG. 2A presents the internal workflow of a database service on a database gateway.

FIG. 2B presents the details workflow of a dedicated service thread.

Figure 2C:
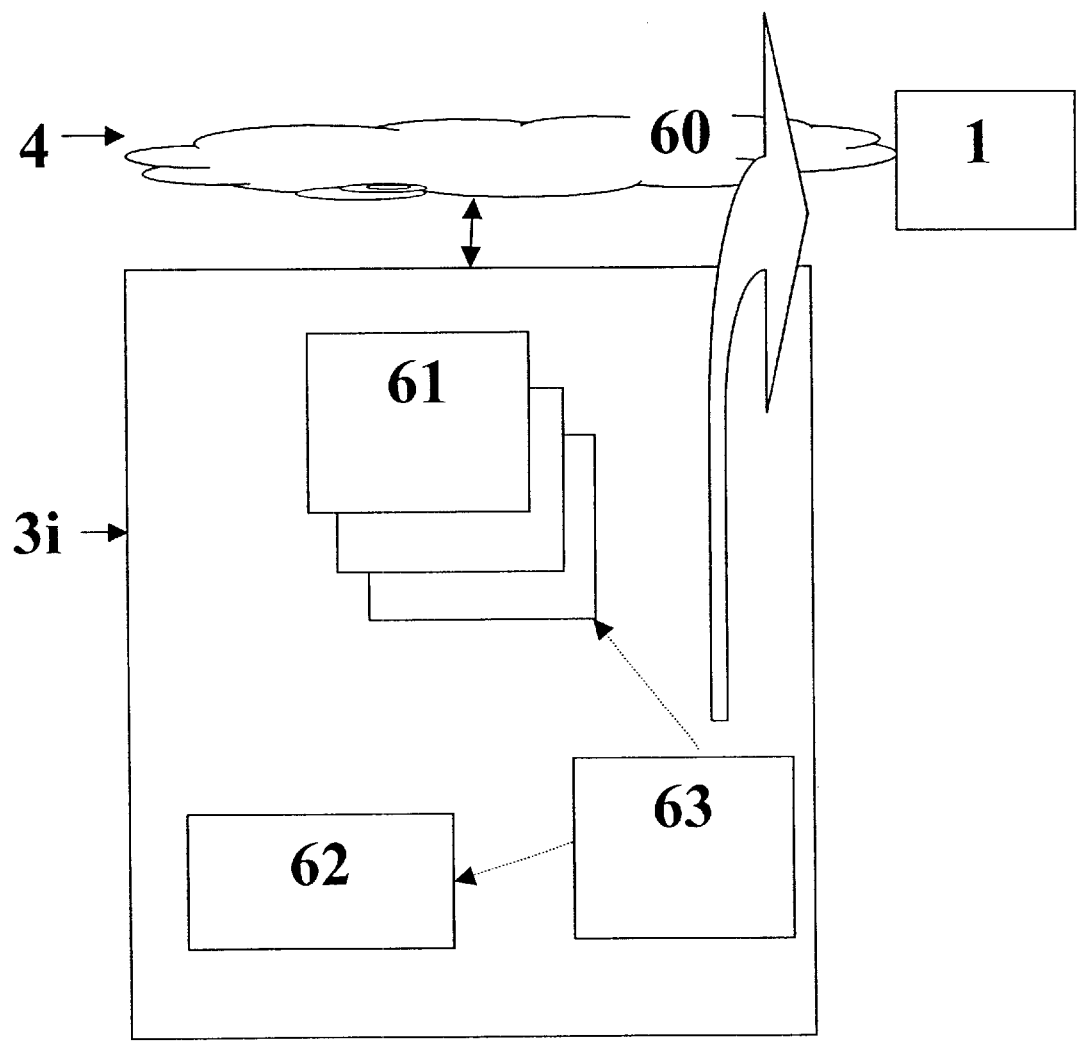

FIG. 2C presents the workflow of a database server monitor.

Figure 2D:
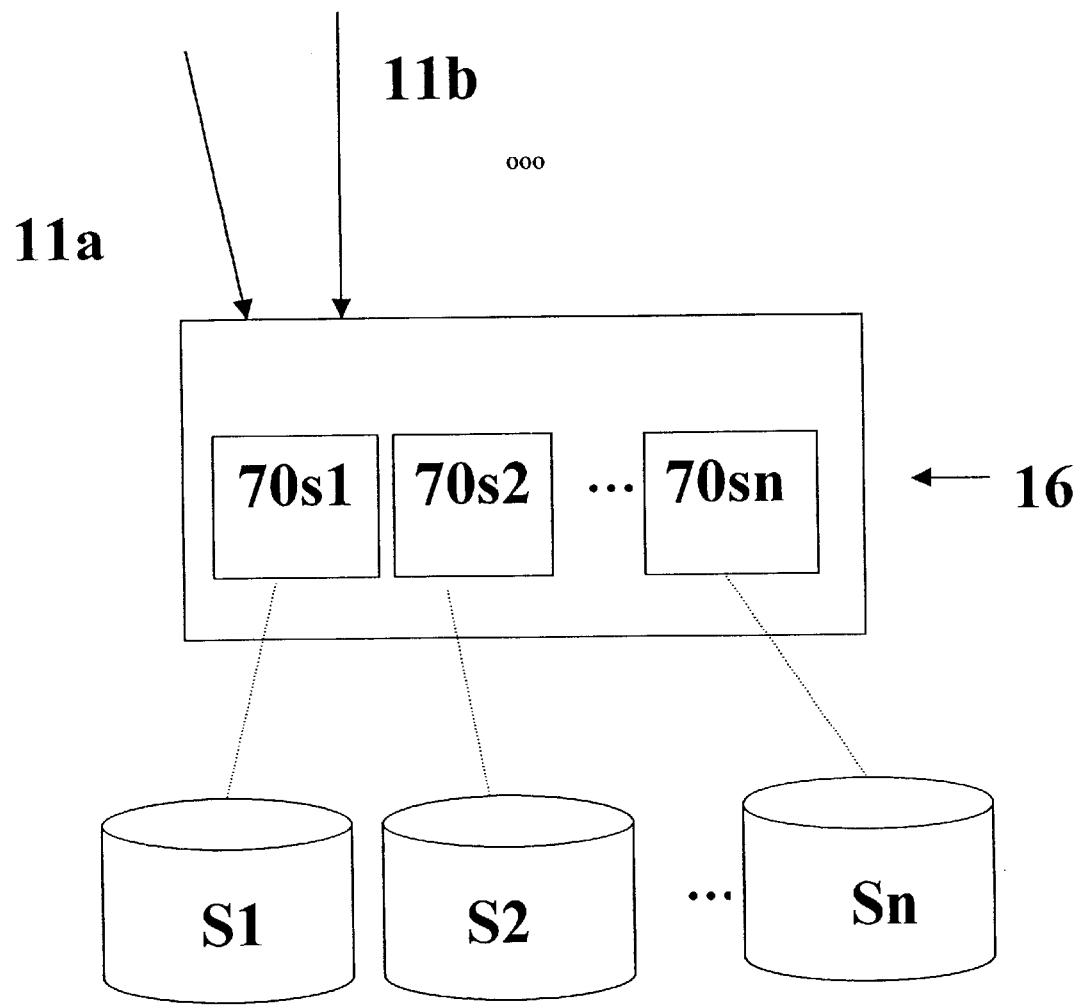

FIG. 2D presents the internal structure of a query synchronizer.

Figure 3:
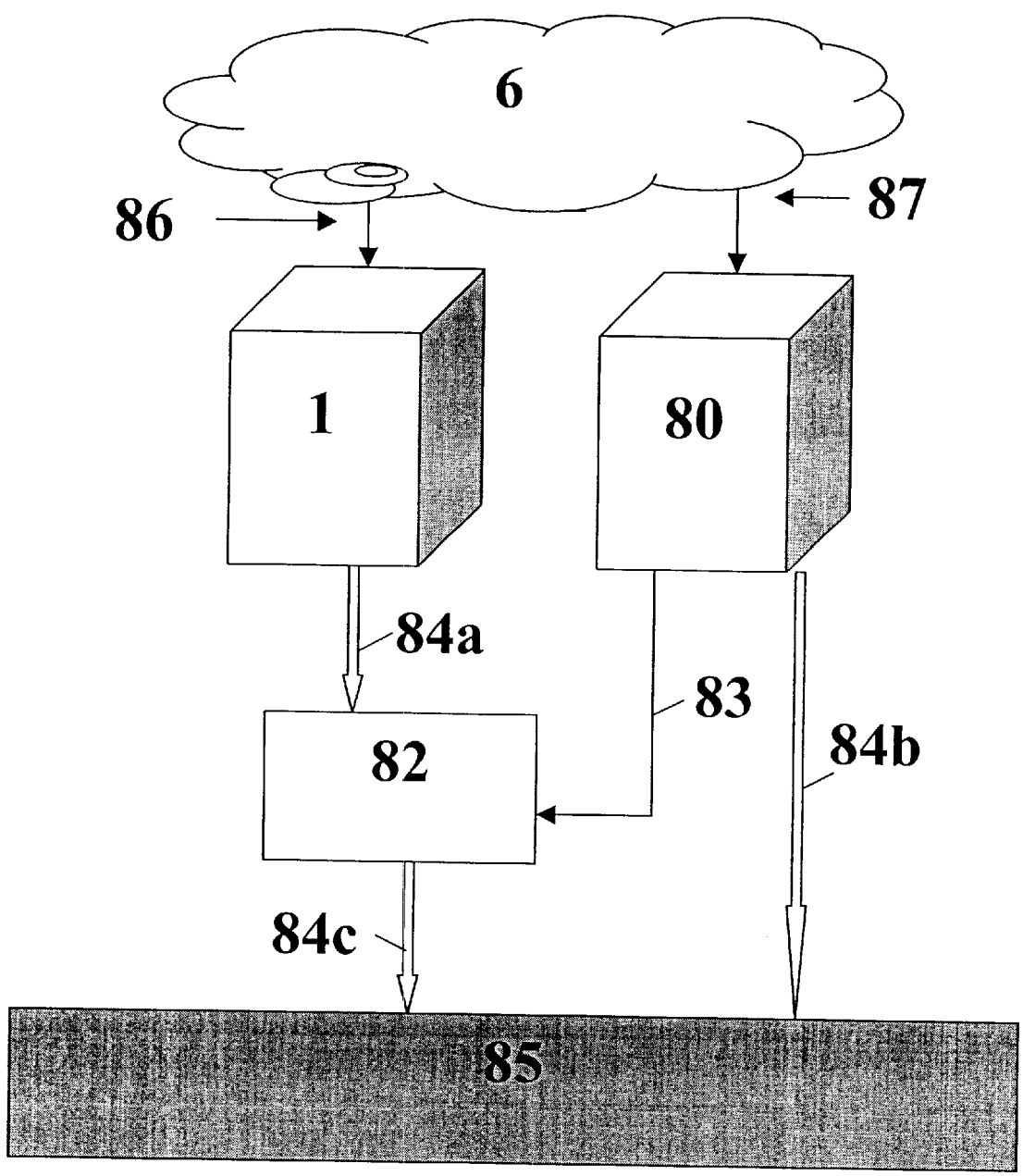

FIG. 3 discloses the architecture for database gateway fault tolerance.

Figure 4:
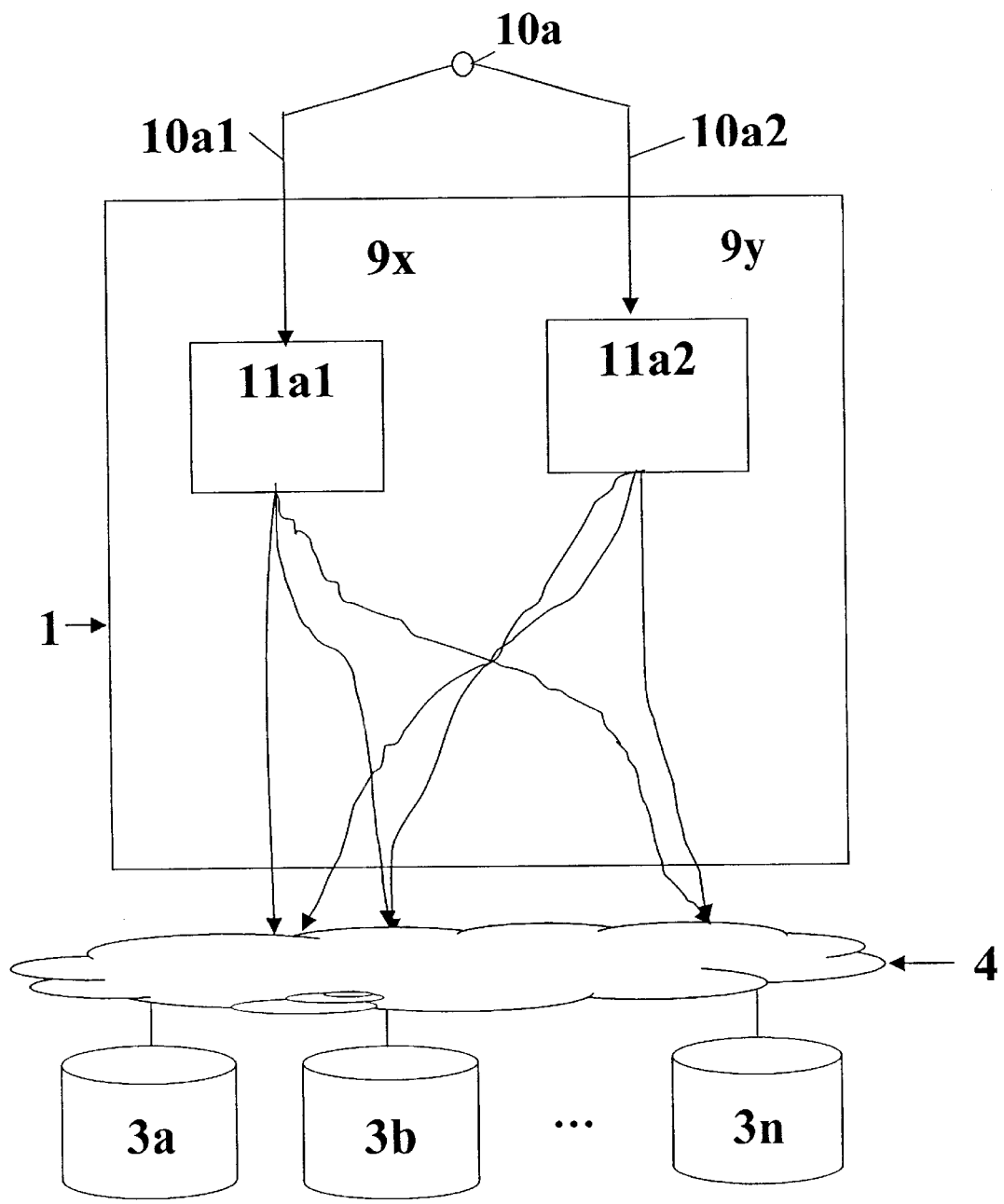

FIG. 4 presents the configuration of two database services in the same database gateway.

Figure 5A:
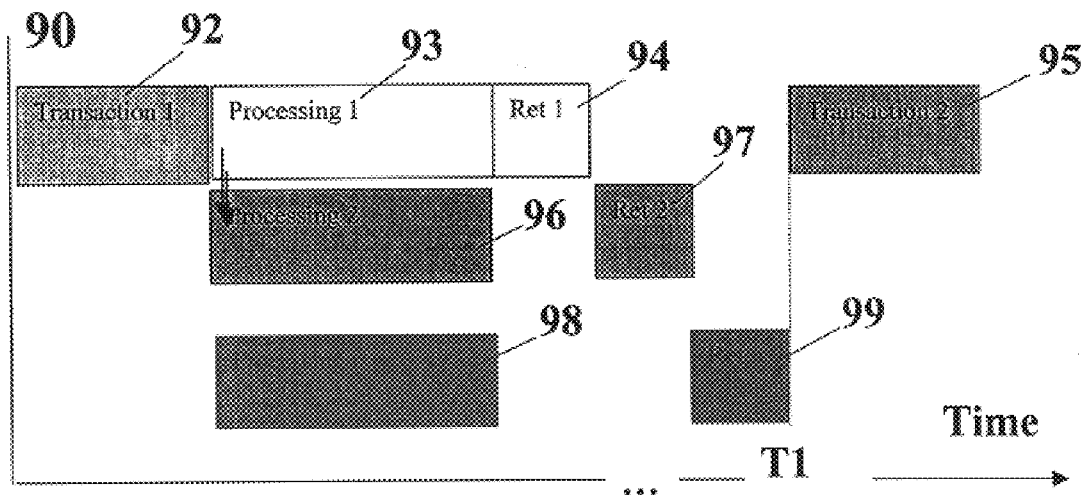
Figure 5B:
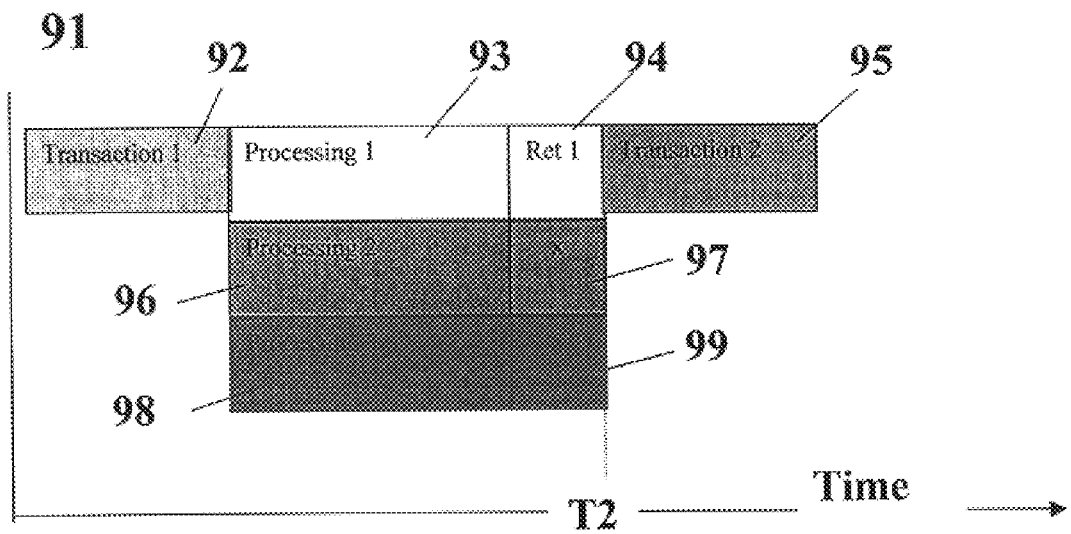

FIGS. 5a and 5b present the timing comparisons between READ-ONLY and update database services.

Figure 6:
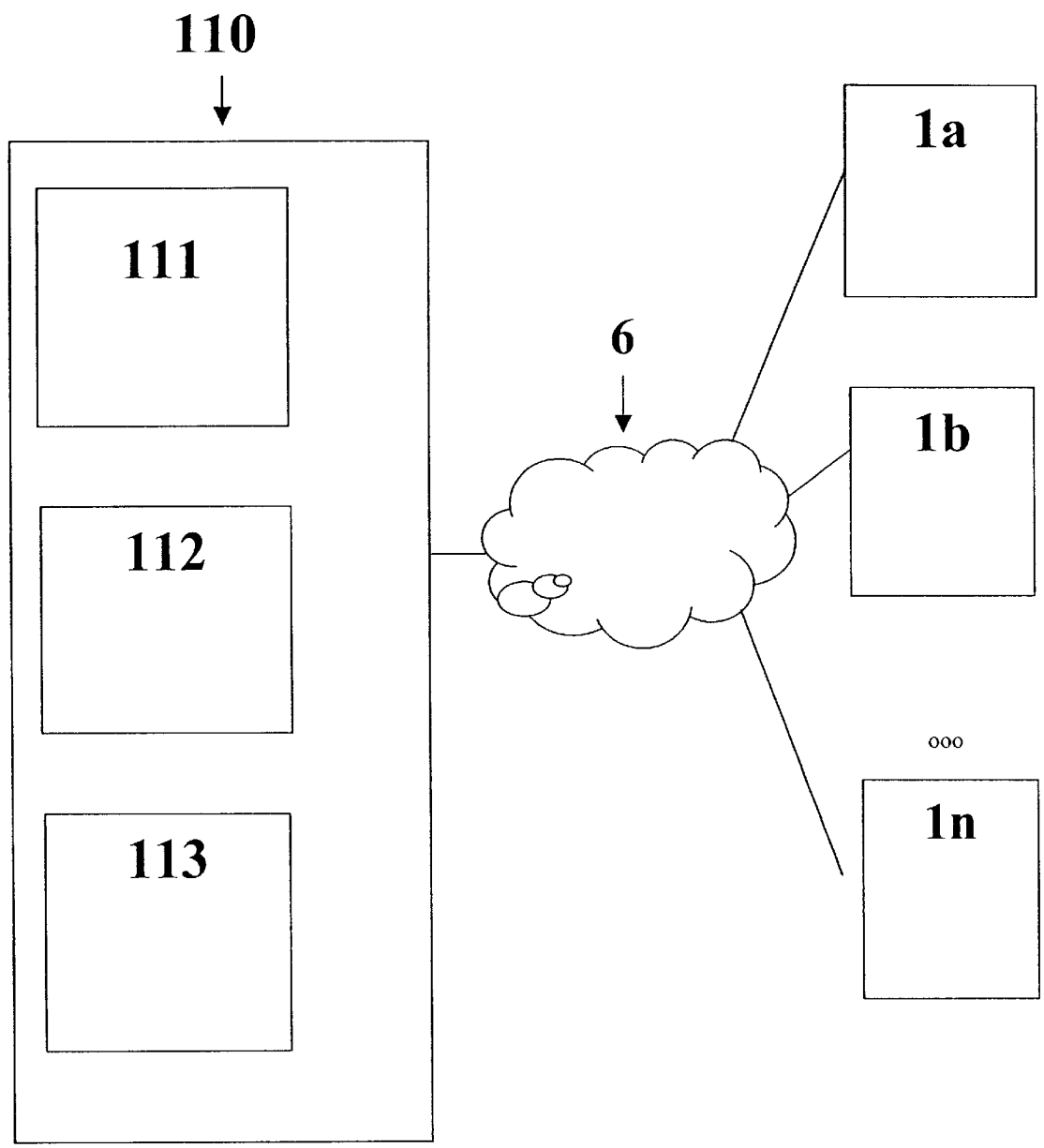

FIG. 6 presents the internal structure of an enterprise manager for configuration and tuning of multiple database services.

DETAILED DESCRIPTION OF THE PREFERRED EMBODIMENT(S)

The overall block diagram of the present invention is shown in FIG. 1. In database network system, a database gateway 1 is installed between a group of redundant database servers 3 and network clients 5 that require database accesses. The database gateway can host a plurality of data services. Each database service captures incoming clients database queries 7, and automatically duplicates client's query into multiple streams 8, each for one of the database servers 3. One of the database servers 3a, 3b . . . 3n is designated as the primary server. Each of the database servers 3 also hosts a database server monitor that checks the database server activities. These monitors report errors and significant early warnings of the server to the corresponding database service. The database service monitors these messages and the status of each client-to-server connection 7,8 at all times. It can detect all database errors related to both hardware and software in addition to broken communication connections. As explained below, an automatic switch over occurs when a database server 3a, 3b . . . 3n is considered unreachable or unstable.

The invention does not address the client-side network connections 6 between the clients and the database gateway which are typically addressed by the client's network access provider. The invention is specifically devoted to the server-side connections 4 between the database servers and the database gateway to address server side failures and faults.

The database gateway is a stand-alone system running a commercial available operating system, such as Unix, with minimum basic functions of an operating system, such as memory management, file system, process and thread management, and TCP/IP networking protocol implementation or functional equivalent are required. The actual hardware requirement can be varied depending on actual implementation. For example, if the database gateway hosts two database services, its memory requirements would preferably be double of that for a database gateway hosting only one database service. Further, if an application requires two client-side networks and two server-side networks, there should be four network interface cards installed. The database service performs automatic data routing between the different networks. The overall network bandwidth can be four times of a single network. For larger scale applications, existing computer clustering techniques can also be used to further scale up the number of simultaneous clients by clustering multiple database gateways.

One embodiment of the invention provides a three state data service regarding to client access: stopped, paused and normal. In the stopped state, data service does not have any active connection. In a pause state, database service cannot accept new connections but may have active connections. In a normal state, database service accepts and may have all types of connections. The three states of data service, in conjunction with READ-ONLY control supported by the database servers, are designed to facilitate database server recovery. A database administrator is responsible for the state designation of a database service. Except for the normal state, all other states can be easily programmed by anyone skilled in programming.

FIG. 2A illustrates the components and basic functionality of the database service in the normal state. It shows the internal data flows between multiple database clients 5 and two database servers 3a, 3b. Database service clients 5a, 5b send database queries through client-side network 6 to the database gateway I/O port 9. The database gateway 1 will create dynamic ports 10a and 10b for direct dedicated communications with clients. The dynamic port 10a is dedicated to the data query issued by client 5a, and the dynamic port 10b is dedicated to the data query issued by client 5b. When the communication by a client 5a or 5b is terminated, the dynamic ports 10a, 10b became available for use by other clients.

Upon receiving a data query request, the database service initiates two types of processing threads: a) dynamic service threads 11a, 11b and b) resident service threads 13, 14, and 15. The resident service threads include: 1) A service controller 13, responsible for service runtime parameter setup, start/stop/pause/resume, and other system configuration and maintenance tasks; 2) A master monitor 14, responsible for monitoring the status of the master database gateway using periodic echo tests or "heart beats"; and automatic take-over if the master database gateway does not echo back within a specified period; and 3) A resource recycle 15, responsible for collecting and returning the unused resources, due to an abnormal disconnection, back to the system.

The database service gateway 1 monitors on a existing communication port 9 client access requests. This port address is publicized to all clients which can access the database contents. This port is preferably customizable to different values reflecting the default settings of different database servers in order to hide the presence of the database gateway from the clients. The gateway 1 also creates connections 12a, 12b . . . 12n to all active database servers 3a, 3b . . . 3n in the group 3 through the coordinating query synchronizer 16. These threads have two main functions: a) to the database client, the thread must make it to "think" that the gateway is the actual database server; and b) to the database server the thread must make "think" it is communicating directly with a database client.

FIG. 2B illustrates the details of the work flow of the dedicated thread. The details of the work flow of a dedicated query thread in pseudo codes are shown in FIG. 2B. Step 30 sets up the communication with the client so it can communicate with the client directly without the intervention from the database gateway. It then tries to connect to all members 3a, 3b . . . 3n of the database server group 3, one being designated as the primary. Step 31 checks to see if the primary database server can be connected. If the primary database server cannot be connected, then the program designates a different active server as the primary server 32. The thread exits if it cannot find any usable active server. Otherwise, it marks all non reachable servers "disabled" and continues to step 34. Step 34 indicates that the thread enters a loop that only exits when a "server shutdown" or "client disconnect" signal is received. Other exits will occur at various errors. Step 35 reads the client query. If this connection is encrypted, this query is decrypted to yield a clear text by step 36. Step 37 processes client login for the active database servers 3a, 3b . . . 3n. Step 38 sends the query to all active database servers via the query synchronizer 16. Step 38 also includes the database server switching function similar to steps 31, 32 and 33, if the primary database server becomes unreachable or unstable during the transmission. Step 39 indicates that it is possible that the client's connection contains no transaction. Step 40 is only activated if this client connection contains transaction packets. Step 40 reads the primary server reply. It also contains the function to switch the primary database server similar to steps 31, 32 and 33, if the primary database server become unreachable or unstable during the transmission. Step 41 optionally logs the transmission. Step 42 checks if this database server has been designated as "READ-ONLY"—a performance enhancement switch. It sends a STOP processing signal to all non-primary database servers. This step conserves communication bandwidth between the servers 3 and the gateway 1, since only the primary server will return the requested READ-ONLY data, instead of all servers returning such information which occurs for other types of database commands.

Step 43 encrypts the server replies if this connection is designated as encrypted. Step sends the replies to the client. Step 45 indicates the need to read and throwaway replies from all non-primary servers. Steps 46–49 conclude this thread and return all resources to the system.

In addition to the normal operations, the database gateway can also be programmed to deny connection by pre-screening a requester's IP address, a function similar to firewalls. This provides additional protection to the database contents.

A database server monitor resides on each of the database servers which continuously monitors the server process status, and the client-to-server connections as shown in FIG. 2B. The database server monitor instantaneously detects failures of the database server and the communication and reports errors.

FIG. 2C presents a database server monitor 63 checking a database server's 3*i* processes 61 and activity/status log files 62 periodically reporting errors and significant warnings 60 to the database gateway 1 through the -server-side network 4. The implementation of the database service monitor is dependent on the design of the database server.

Once the database gateway establishes a dedicated thread for each data request 11*a*, 11*b* for the client's database transaction, a query synchronizer 16 places all data requests in a queue to guarantee that all database servers receive communication packets in the same sequence as illustrated in FIG. 2D.

The query Synchronizer 16 uses a software lock 70*s*1, 70*s*2 . . . 70*s*N for each of the database servers 3*a*, 3*b* . . . 3*n*. These locks are used to enforce the same packet sequence to be sent to all database servers. The software lock helps to prevent race condition, one of the major database problems. Race condition occurs if the multiple database servers process the identically sequenced queries differently. Therefore, it is necessary to require the database servers to enforce a first-come-first-serve policy for all processing threads. The query synchronizer and software lock implementation in the present invention eliminates race condition completely by queuing all database commands in the same order for all servers 3*a*, 3*b* . . . 3*n*.

Since the database gateway 1 acts as a buffer and a pre-process filter that performs no actual data manipulations nor saves any data, the hardware requirements of a database gateway 1 are less complicated as compared to a database server. Consequently, the probability of database gateway failure is comparatively lower than that for a database server. Nevertheless, to eliminate the single-point-of-failure, there is a need to protect the database gateway 1 as well.

Database gateway fault tolerance can be achieved using a technique known as IP-takeover. Another embodiment of the invention, shown in FIG. 3, illustrates a master database gateway 1 connected with a slave database gateway 80 via a client-side network 6. Preferably, the slave database gateway 80 has a special control over the master database gateway's AC power supply.

In FIG. 3, the master database gateway 1 is connected to network using one IP address 86. The Slave database gateway is connected on the same network using another IP address 87. The master gateway's AC power 84*a* is supplied by an AC power controller 82 which is software switchable by the slave database gateway 80 via a RS232 cable 83. The AC power controller 82 and the slave database gateway 80 obtain their AC power via supply lines 84*b* and 84*c* from an final AC power source 85. The slave database gateway 80 sends periodic signals via IP address 86, 87 of network to the master database gateway 1 and demands an echo from the master database gateway 1. If the master gateway does not echo its signal within a certain period of time, the slave gateway 80 initiates a take-over by shutting down the AC power through a signal over line 83 to controller 82 and also replaces its own IP address 87 with the IP address used by the master gateway 86. Thus backup gateway 80 assumes the database gateway functions. The novel feature of this particular embodiment is that it avoids any potential network conflicts due to residual active threads still active in the partially crashed master database gateway.

The present invention treats a "READ-ONLY" type query that requires a large return data that is different from other types of database query. A database gateway 1 connecting to database servers 3*a*, 3*b* . . . 3*n*, hosts two types of database services for each fault tolerant database server, one for READ-ONLY queries and the other for update queries as illustrated in FIG. 4. In this example, one of the database services 10*ai* is designated as READ-ONLY and another service 10*az* for all other types of update queries. The services 10*ai* and 10*az* monitor commands and are respectively associated with dedicated thread for each data request 11*ai* and 11*az*.

As explained in step 45 of FIG. 2B, the update database service thread 11 will attempt to read and discards replies of all non-primary servers which this will have a negative performance effect if the database service requires a large return data set. As shown in FIG. 5A, without a separate READ-ONLY service, a READ-ONLY transaction 92 will invoke the primary server to preform processing 92 and return with data return. The gateway also directs all other non-primary servers to concurrently process the READ-ONLY transaction, represented by processing 2 96 in through processing 98. The gateway 1 waits for the return data before it starts a next transaction 2 95. With the feature of separate READ-ONLY service in the database gateway 1, as shown in FIG. 5B, the READ-ONLY database service thread 11*ai* sends a STOP signal to all non-primary database servers, thus improving its timing significantly since there is no delay in receiving return information 97 and 99 from the duplicate processing 2 and 3, 96 and 98. Accordingly, READ-ONLY query 91 of FIG. 5B is significantly reduced due to the STOP signals sent in step 43 of FIG. 2B in comparison to the timing of an update query shown in FIG. 5A. Since update queries do not generally contain large return data sets, the overall system's performance to processing data queries is thus optimized.

The present invention is flexible by providing management means to setup and modify different tuning parameters of a database gateway remotely. FIG. 6 illustrates the top-level diagram of an enterprise fault tolerant database manager 110 that can setup and manage multiple database gateways. Each of the database gateways should be properly connected to a database server group as illustrated in FIG. 1. The enterprise manager 110 can perform its management functions remotely.

The enterprise manager includes three main functions:

a) A fault tolerant database service controller 111. This group functions include:
1) setup fault tolerant database service: define data port, management port, define database server group, gateway primary/slave and primary/backup role.
2) runtime functions: Start/stop/pause/resume.

b) A database Server Controller 112. This group functions include:
1) define database server network address and port number.
2) define database server monitor port, error message filtering and parameter.

c) A database Connection Controller 113. This group functions include:
1) show connection status.
2) force closing of a connection.

One embodiment of the present invention includes one database gateway connected to a client-side network and a server-side network that includes all functions for data encryption, access filtering and database server monitor communication. For applications with mixed READ-ONLY and update queries, the database gateway preferably hosts at least two database services, one for READ-ONLY and the other for update queries. Each of the database servers in the supporting server group preferably have the database server monitor installed and running. Each of the database servers preferably employ the first-come-first-serve scheduling policy.

An alternative embodiment is to merge the client-side network and the server-side network into the same network. This is suitable for low cost implementations but suffers from the potential network performance bottleneck.

Another alternative embodiment of the present invention, in the database servers, can function without the first-come-first-serve policy. The invention is still effective to all applications that do not require multiple users updating the same record at the same time. This is because that race conditions only occur when multiple users updating the same record at the same time.

A third alternative embodiment is implemented in a single type database service on the same database gateway. The system will still function but suffers performance loss if there are READ-ONLY queries with large return data sets.

A fourth alternative embodiment of the present invention is without the encryption function in the database gateway. This eliminates the encryption process overhead but exposes the raw data movements on the client-side or the server-side network. If any part of the data access network uses the Internet, it may present a potential security risk.

The present invention performs instant database transaction replication while using off-the-shelf database servers. This allows applications to setup cost-effective multiple database servers either locally or distributed globally. Any change in one database server will be instantly reflected in all database servers in the same group.

The present invention provides instant database service fault tolerance without expensive hardware-aware database server software changes. This eliminates the possibility of lost transactions using non-concurrent replication methods where no changes in data access programs nor modifications to the database servers is required. The database gateway can be built entirely by off-the-shelf hardware.

The present invention allows on-line repair of crashed database servers. Once a server crash is detected, the database gateway 1 automatically disallows data access to the crashed server. Database administrators can then service the non-working database server for online repair. On-line repair may consist of data reloading, device re-allocation and/or database server reinstallation. Even operating system reinstallation without affecting the on-going database service may be performed. Thus, the invention allows more flexible time for off-line repair of crashed database servers.

If a crash is hardware related, the crashed database server can be taken off-line for off-line repair. Application of the present invention gives the administrators more time and easy access for the repair since the database service is not interrupted while the off-line repair is in progress.

The present invention also provides more protection to critical data than direct database access. The database gateway's network address filtering function can deny data access from any number of predetermined hosts. This can further filter out undesirable data visitors from the users that are allowed access to the network. The database gateway encryption function allows data encryption on all or part of the data networks. It is easy to manage. Even though the invention uses multiple redundant database servers, management of these servers is identical to that of a single database server through the database gateway, except when there is a crash. Accordingly, one can define/change/remove tables, relations, users and devices through the database gateway as if there is only one database server. All functions will be automatically replicated to all database servers at the same time with high reliability and low-cost components. When a repaired database server is ready to be put back into service, the primary database server will be switched into READ-ONLY mode. Except database read transactions, there are no further database updates and write transactions to the primary database server from this point. The database of primary database server will be copied to all non-primary database servers including the repaired database server. When the database of all non-primary database servers and the database of the primary database server are synchronized, all database servers are switched back to normal operation mode.

What is claimed is:

1. A method for assuring consistent data processing in a networking database system, where the networking database system has a plurality of database clients communicating information in packets comprising the steps of:

providing a plurality of database servers;

monitoring the status of said database servers to determine functionality;

intercepting database transaction commands issued from database clients before communicating to a database server and intercepts information from database servers before communicating to database clients;

duplicating database transaction commands for each of said database servers which are currently functional; and synchronizing the delivery of said duplicated database transaction commands to all currently functional database servers, whereby all current functional servers process all database commands concurrently.

2. The method of claim 1 further comprising the steps of:

running monitoring software on each of said database servers;

reporting hardware, software and communication errors of said database servers;

checking the severity of the reported errors and updating the status of said database servers as non-functional based upon a predetermined error threshold;

discontinuing processing with database servers identified as non-functional;

repairing non-functional database servers and updating such servers with current data and functional status; and reconnecting said repaired database servers.

3. The method of claim 1 wherein the step of synchronizing the delivery of database transaction commands further comprises queuing all database transaction commands for each server in the same order before sending said commands to said database servers.

4. The method of claim 3 further comprising processing said queued database transaction commands using a first in first out algorithm.

5. The method of claim 3 wherein the step of synchronizing the delivery of database transactions further comprises the steps of:

designating one said functional database server as a primary server;

distinguishing database transaction commands into READ-ONLY type and other types;

setting up a queue for said READ-ONLY database transaction commands and at least one queue for all other types database transaction commands; and communicating READ-ONLY type database transaction commands to said functional servers such that data is only returned from said primary server and not any other database server whereby communication capacity is conserved.

6. The method of claim 5 wherein communicating READ-ONLY commands comprises communicating a stop processing command to each functional server which has not been designated as the primary server.

7. The method of claim 1 wherein the step of intercepting of commands includes the steps of:

decrypting incoming communication packets from clients; and encrypting outgoing communication packets to clients.

8. The method of claim 1 further comprising of the step of denying access by database clients based on predetermined criteria, such as network address and port address.

9. The method of claim 3 wherein the step of monitoring the status of said database servers includes setting up a plurality of statuses that indicate whether a database server can process new database transaction commands from said database clients, whether a database server can continue processing already queued commands, but cannot process further commands from said database clients, or whether a database server is non-functional based upon predetermined error criteria.

10. The method of claim 1 wherein at least two of said database servers are provided in different networks and said synchronized delivery of said database commands is by inter-networking communication.

11. An apparatus database service system for assuring consistent data processing in a networking database system accessed by a plurality of database clients communicating information in packets comprising:

a plurality of database servers;

means for monitoring the status of said database servers to determine functionality;

a gateway intercepting database transaction commands issued from the database clients before communicating to any database server and receiving information from database servers before communication to database clients;

said gateway duplicating said database transaction commands for each of said database servers which are currently functional; and said gateway synchronizing the delivery of said duplicated database transaction commands to all currently functional database servers, whereby all current functional servers process all database commands concurrently.

12. The system of claim 11 further comprising:

means for running monitoring software on each of said database servers;

means for reporting hardware, software and communication errors of said database servers;

means for checking the severity of the reported errors and updating the status of said database servers as non-functional based upon a predetermined error threshold;

means for discontinuing processing with database servers identified as non-functional;

means for repairing non-functional database servers and updating such servers with current data and functional status; and means for reconnecting said repaired database servers.

13. The system of claim 11 wherein means for synchronizing the delivery of database transaction commands further comprises means for queuing all database transaction commands.

14. The system of claim 11 further comprising means for processing said queued database transaction commands using first in first out algorithm.

15. The system of claim 11 wherein means for synchronizing the delivery of database transactions further comprises:

means for designating one said functional database server as a primary server;

means for distinguishing database transaction commands into READ-ONLY type and other types;

means for setting up a queue for said READ-ONLY database transaction commands and at least one queue for all other types database transaction commands; and means for communicating READ-ONLY type database transaction commands to said functional servers such that data is only returned from said primary server and not any other database server whereby communicating capacity is conserved.

16. The system of claim 15 wherein means for communicating READ-ONLY commands comprises means for communicating a stop processing command to each functional server which has not been designated as the primary server.

17. The system of claim 11 further comprising a user interface wherein said database system parameters such as network address, port addresses, optional synchronizing features, or the switch of primary server can be modified anywhere on the network based on individual system needed.

18. The system of claim 11 further comprising:

means for decrypting incoming communication packets from clients; and means for encrypting outgoing communication packets to clients.

19. The system of claim 11 further comprising means for denying access by database clients based on predetermined criteria, such as network address, port address.

20. The system of claim 11 wherein means for monitoring the status of said database servers includes means for setting up a plurality of statuses that indicate whether a database server can process new database transaction commands from said database clients, whether a database server can continue processing already queued commands, but cannot process further commands from said database clients, or whether a database server is non-functional based upon predetermined error criteria.

21. The system of claim 11 wherein at least two of said database servers are provided in different networks and said synchronized delivery of said database commands is by inter-networking communication.

22. The system of claim 11 wherein having a master unit and a slave unit of said apparatus further comprises:

means for monitoring the functionality of said master unit by said slave unit;

means for shutting down said failing master unit by said slave unit; and means for taking over the functions of said master unit by said slave unit with assigning said slave unit's IP address as the new master unit IP address for the network and all communications from/to said database servers and said database clients are directed to said new master unit.

23. The system of claim 21 wherein means for shutting down said failing master unit further comprises cutting off the power source of said maser unit.

24. A gateway used for assuring consistent data processing in a networking database system that has a plurality of database servers and a plurality of database clients communicating information in packets comprising:

means for monitoring the status of said database servers to determine functionality;

means for intercepting database transaction commands issued from the database clients before communicating to any database server and receiving information from database servers before communication to database clients;

means for duplicating said database transaction commands for each of said database servers which are currently functional; and means for synchronizing the delivery of said duplicated database transaction commands to all currently functional database servers, whereby all current functional servers process all database commands concurrently.

* * * * *